Jan. 22, 1963    R. CORTES    3,074,777
METHOD OF CHLORINATING AN AGGLOMERATE-FREE
FLUID BED OF TITANIUM-BEARING MATERIALS
Filed Jan. 28, 1959
FIG. 1
FIG. 3
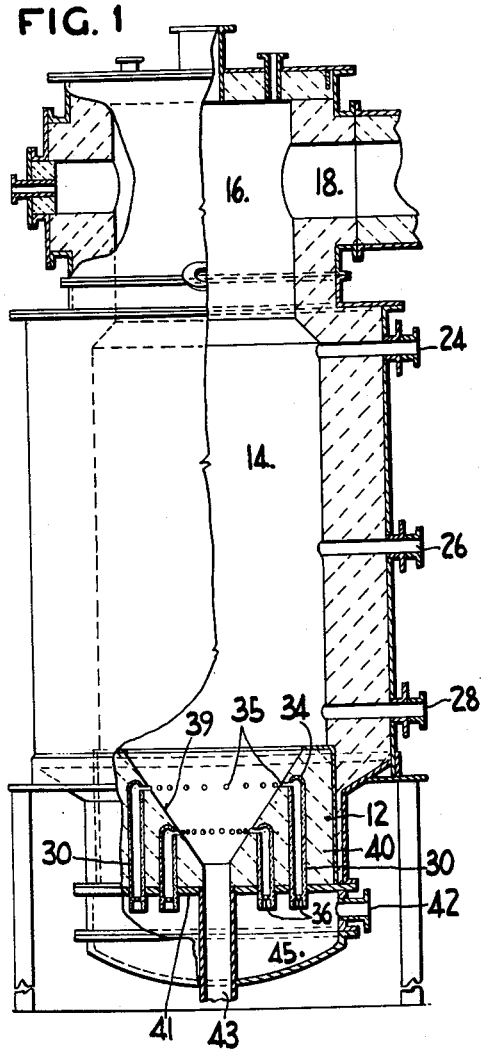
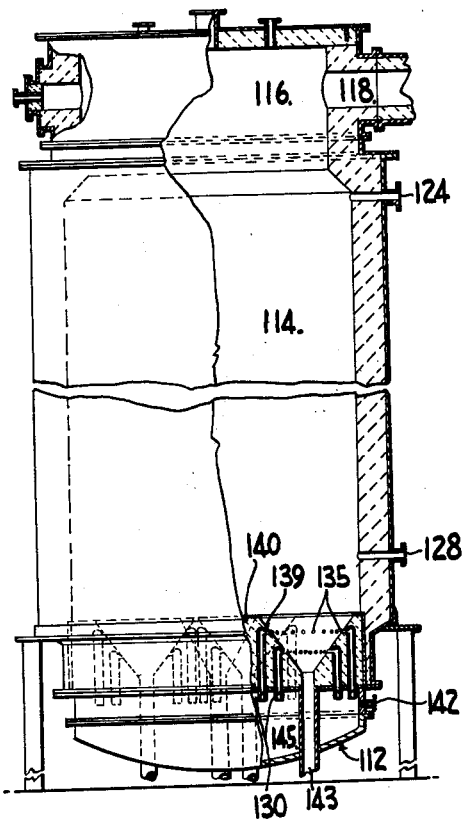
FIG. 2
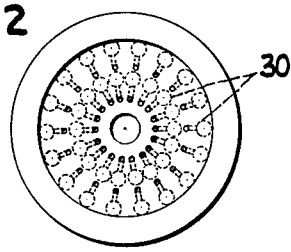
FIG. 4
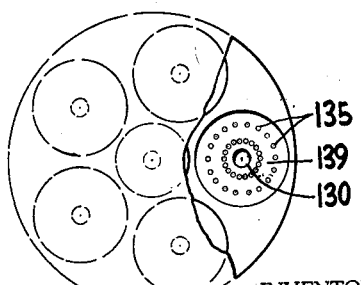
INVENTOR.
RICARDO CORTES, DECEASED
BY BEVERLY CORTES, ADMINISTRATRIX
BY
Oscar L. Spencer
ATTORNEY

3,074,777
METHOD OF CHLORINATING AN AGGLOMERATE-FREE FLUID BED OF TITANIUM-BEARING MATERIALS

Ricardo Cortes, deceased, late of New Martinsville, W. Va., by Beverly Cortes, administratrix, New Martinsville, W. Va., assignor, by mesne assignments, to Pittsburgh Plate Glass Company
Filed Jan. 28, 1959, Ser. No. 789,609
5 Claims. (Cl. 23—87)

This invention relates to a novel method and apparatus for chlorinating metal bearing materials which contain alkaline earth metal compounds as impurities. It is particularly directed to the chlorination of titanium oxide bearing ores and slags which contain at least 10 to 20 percent by weight of titanium, and also contain substantial amounts (for example, 0.25 to 8 percent by weight) of alkaline earth metals such as calcium or magnesium. Thus, the invention is useful for the chlorination of oxide slags which are produced by heating ilmenite ore with a carbonaceous reducing agent, such as wood chips, coal, coke or the like, to effect a partial reduction of iron to metallic state and separating the slag thus obtained from the resulting molten iron. Typical slags of this type are produced according to various methods such as those disclosed in United States Letters Patent Nos. 2,476,453 and 2,798,048. One of the commercial slags of this type is known as "Sorel slag."

The chlorination of materials of this character in a fluidized or dynamic bed is difficult. In the course of the chlorination, alkaline earth metal chloride such as calcium chloride or magnesium chloride, is formed in a molten or sticky state. This causes the bed to agglomerate to such an extent that further operation becomes impossible.

Several methods of avoiding this difficulty have been proposed. Thus, it has been suggested that a large portion of the bed be withdrawn from the zone of chlorination, washed to remove alkaline earth metal chloride, and the washed residue returned to the bed. This has several objections. In the first place, it reduces the productivity of the bed since introduction of recycled material usually requires reduction in the rate of feed of fresh slag. Moreover, the recycling increases the overall cost of the process.

The present invention eliminates many of the difficulties. According to this invention, titanium oxide bearing materials and like materials containing components which form fused chlorides during chlorination are chlorinated by establishing a fluidized or dynamic bed in a chlorination chamber and in an upwardly rising stream of chlorine, introducing at least a portion of the fluidizing chlorine into the chamber at a point or points well above (usually 2 or more inches above) the bottom of the chamber, and withdrawing a portion (rarely more than 5–10 percent of the bed) periodically or continuously from a point or points below where the fluidizing chlorine is introduced. By following this procedure, there is established a relatively low temperature quiescent zone below the level at which the chlorine is introduced. Consequently, as calcium chloride or magnesium chloride formed during chlorination agglomerates particles of the bed, the particles fall to the bottom of the bed and are withdrawn.

The invention is best practiced by means of a furnace having a chlorination zone having bottom sections which taper downwardly. For example, the bottom of the reactor may be in the form of a cone or a plurality of cones which taper downwardly and which terminate in a discharge pipe. Chlorine is fed to the reactor chamber at points along the upper portion of the sloping side cone well above (two or more inches) the bottom thereof. Thus, the agglomerated particles settle in the bottom of the cone below the point or points where the major part of the chlorine is introduced and these settled particles are withdrawn through the discharge pipe or pipes.

A brief discussion of the characteristics of the type of dynamic beds contemplated here may aid understanding. When a gas is passed through a bed of solid material, several types of conditions can be established depending upon the velocity of the gas. Where the gas velocity is low, the bed of solids remains static and the gas simply passes through the pores of the bed. As the gas velocity is increased, some or all of the particles become suspended in the upwardly flowing gas stream and are thus in more or les constant movement. This results in expansion of the bed and the bed consequently expands in height. Beds which are expanded by such flow of gas from the height which they exhibit in static state may be termed "dynamic beds" or "fluidized beds."

With further increase in the velocity of gases, all of the particles become suspended and expansion of the bed increases with increasing velocity, thereby increasing the average distance between the suspended particles. At the higher velocities, the bed is highly turbulent and has many of the characteristics of a boiling liquid.

In the practice of the present process, titanium oxide bearing materials which have a particle size in the range of about 75 to 500 microns, preferably having an average particle size of about 75 to 200 microns, as supplied to the chlorination zone normally are treated. The exact rate of flow of chlorine into the bed for optimum operation depends to an appreciable degree upon the temperature of the reaction zone.

The rate of chlorine introduction into the fluidizing bed normally is in excess of about 30 pounds per hour per square foot of cross-sectional area of chlorination zone but rarely should be in excess of about 200 to 250 pounds per hour per square foot.

To effect the chlorination herein contemplated, special apparatus has been provided according to this invention. The nature of the apparatus may be more fully understood by reference to the ensuing disclosure taken with the accompanying drawings, in which:

FIG. 1 is a diagrammatic view partially in section of a typical furnace structure which is used in accordance with the present invention;

FIG. 2 is a diagrammatic plan view of the bottom of the furnace illustrated in FIG. 1;

FIG. 3 is a diagrammatic view partially in section of another embodiment of the invention; and FIG. 4 is a diagrammatic plan view of the bottom of the chlorination zone of the furnace illustrated in FIG. 3.

As shown in FIG. 1, a furnace in which the reactions herein contemplated may be conducted conveniently may be one having a shaft or reactor section 14, a top section 16, and a bottom or chlorine distributor section 12. The reactor section 14 comprises a shaft lined with refractory brick capable of withstanding the attack of chlorine at the temperature of operation. The internal diameter of such shaft may be of any convenient size and, in commercial operation, normally exceeds about 3 feet. Several outlets 24, 26, and 28 extend through the reactor wall and bottom and provide means for introducing coolants such as titanium tetrachloride into the bed, and/or for introducing feed.

Disposed in the top section 16 is a vapor outlet duct 18 for removal of vapors resulting from the chlorination of the metal bearing material. Inlets are provided (not shown) into the reactor at several points therein in order to provide access to the interior of the reactor to take bed temperatures, temperatures above the bed, and generally to afford auxiliary openings into the reactor for various reasons.

The chlorine distributor section 12 is removably attached to the bottom of the reactor section 14 and is designed to provide a uniform supply of chlorinating gas to the bed within the reactor. This section consists of a refractory base 40 which serves as the bottom or floor of the reactor and which rests upon metal plate 41 which in turn is bolted to the bottom of the shaft.

A plurality of spaced gas conduits 30 extend through the plate 41 and the base 40, providing communication between the chlorinating gas header 42 and the interior of the shaft furnace. These conduits are uniformly disposed throughout the base at a convenient spacing, for example, 3 to 15 inches, preferably less than 12 inches, between centers.

Each conduit is provided at its lower end with an orifice 36 which is carefully machined, usually of metal, to provide a substantial pressure drop (usually 2 or more pounds per square inch) across the orifice. To achieve substantially uniform flow through each orifice, each should be designed to provide substantially the same pressure drop. At the upper end of each conduit is a head 34 which is closed at the top and has an outlet 35 which vents into the bottom of the chlorination zone.

As shown in the drawing the bottom section 12 comprises a metal base in which are mounted a plurality of vertically disposed tubes 30 having walls which are impermeable to chlorine. These tubes are sealed to the metal base 41 to prevent chlorine from flowing in channels outside the conduits. A concrete base is cast around the tubes and is bonded to the base and provides a cone 39 in the upper portion thereof. This cone constitutes the bottom of the reaction chamber in the reaction furnace. The tubes deliver chlorine to the cone at points radially disposed along the cone wall through inlet 35. As shown in the drawing, these inlets 35 admit chlorine at two levels. However, a greater number of banks of such inlets may be provided, if desired. The cone terminates in its bottom in an outlet tube 43 through which the bed may be purged.

In the operaiton of the process, the furnace is brought up to temperatures in any convenient way as, for example, by introducing a bed of coke or other carbonaceous material into the reactor through one or more of the inlets 24, 26 and 28. The coke is ignited and air is blown through the conduits 30 to support combustion and to fluidize the coke. After the temperature of the furnace has been raised to the desired level, usually above 500° C. and preferably 700 to 900° C. and rarely over about 1200 to 1400° C., it is ready for commencement of the chlorination process.

The slag or like material subjected to chlorination is mixed with powdered carbon, coke, anthracite or equivalent carbonaceous material with an average size of approximately 100 to 900 microns or below, but often having a wide scatter. The percentage of carbon to be added may vary according to other conditions such, for example, as the oxygen content of the chlorine gases fed in, but is usually enough to provide a carbon content in the bed from 10 to 50 percent by weight of the total composition of the bed. Normally, the ore-carbon mixture is blended before feeding to the furnace although separate feeds for each constituent may be used.

To initiate the reaction, the furnace is preheated and then slag-carbon mixture is introduced into the furnace in amount sufficient to establish a bed about 1 to 6 feet in height. Chlorine is introduced into the reservoir 42, with or without air or oxygen, and flows through conduits 30 at a rate sufficient to produce a fluidized or dynamic bed.

The chlorine thus introduced chlorinates metal components of the bed, forming and vaporizing titanium tetrachloride and iron chloride. These chlorides are carried away from the bed and are conducted to a condensation system through duct 18. As a consequence of the chlorination, heat is evolved, thus maintaining the temperature of the bed at reaction temperature.

The reaction can be carried out continuously by feeding further chlorine, slag, and carbon continuously or intermittently to the bed and withdrawing the vapors from the bed. The temperature of the bed may be maintained at a convenient level by controlling the rate of chlorination. When the temperature is low, for example, the rate of chlorine introduced is increased. Slag is introduced at a rate sufficient to maintain a bed at least one foot deep, measured when the bed is static, i.e., with chlorine flow off.

The carbon is introduced at a rate sufficient to maintain a substantial concentration of carbon (usually 10 to 50 percent by weight) in the reaction bed.

The depth of the bed and the pressure drop across the orifices 36 are correlated so that the pressure drop across the orifice is high with respect to the pressure drop across the bed. Normally, the diameter of the orifices is adjusted so that at normal rates of chlorine flow the pressure drop across the conduits or tubes 30 is at least one-half the pressure drop across the bed.

Periodically or continuously, a portion of the bed is withdrawn from the bottom of the cone through outlet pipe 43. The amount of this purge is small and rarely amounts to more than 15 percent by weight of the ore fed to the bed.

FIG. 3 illustrates a further embodiment of the invention in which a plurality of cones are provided in the bottom of the furnace. As therein shown, a large furnace having an internal diameter greater than 4 feet is provided.

The furnace is constructed in a manner similar to that of the furnace illustrated in FIG. 1. Thus, the furnace comprises a shaft or reactor section 114, a top section 116 and a bottom or chlorinator section 112. The reactor section has inlets 124 and 128 for introducing slag to be chlorinated into the furnace. As in the furnace illustrated in FIG. 1 the top section has an outlet 118 for evolved vapors.

The bottom section 112 is constructed in the same style as bottom section 12 except that it is provided with a plurality of cones 139 in the bottom. Each cone has an outlet 143 for purging the bed and chlorine is conveyed through the base 140 from the chlorine header 145 through conduits 130 which have the same construction as conduits 30 and is discharged through ports 135.

In the operation of this furnace the larger agglomerates of the bed are allowed to accumulate in the lower parts of the cones and are withdrawn through outlets 143.

It will be understood that the bottoms may have configurations other than conical so long as the bottom is provided with one or more tapering or inclined sections providing space below the chlorine inlets to collect fractions of the bed which would otherwise cause the bed to become inoperative and to remove such fractions from the chlorination zone.

*Example I*

A titanium bearing material is fed to a shaft furnace of the type shown in FIG. 1 hereinabove described, the furnace comprising an outer shell lined with chlorine-resisting brickwork and having an internal diameter of about 2 feet.

The cone in the base of the shaft furnace had a slope of 60° inclined from the horizontal. Eighteen tubes or chlorine conduits 30 each provided with orifices of restricted diameter to provide a pressure drop of about 7 pounds per square inch during normal chlorine flow were mounted in the base, as illustrated in FIG. 1.

The titanium bearing material used in this run was a titanium oxide bearing slag having the following compositions:

|    | Percent by Weight | Screen Size Tyler Mesh | Analysis Percent Retained on Screen |
|----|-------------------|------------------------|-------------------------------------|
| Ti | 45.3 | | |
| Ca | 0.61 | 65 | 30.4 |
| C  | 0.4 | 100 | 36.7 |
| Fe | 8.2 | 115 | 12.5 |
| Mg | 2.7 | 150 | 9.3 |
| Al | 1.7 | 170 | 5.0 |
| Mn | 0.3 | 200 | 2.7 |
| Si | 1.8 | Pan | 3.6 |
| S  | 0.04 | | |

At the start of the run 1060 pounds of this slag was introduced into the furnace. The furnace was heated to 1200° F. by inserting a gas lance into the furnace above the slag and burning methane gas introduced through the lance. After the temperature rose to 1200° F. petroleum coke was introduced and air fed to the reactor through the chlorine inlets to fluidize the charge and ignite the coke. When the temperature of the bed reached 1750° F., chlorine was turned on and fed to the reactor through the tubes 30 at the rate of 80 pounds per hour per square foot of cross-sectional area of the furnace interior. The chlorination was conducted for about 70 hours' chlorination time, the run interrupted several times to make minor repairs in the system. Slag and coke were fed to the bed at a rate sufficient to maintain the depth of the bed measured while the bed was static at a depth of 40 to 90 inches, the coke introduced being about 20 percent by weight of the slag introduced. From time to time oxygen was fed into the reactor to maintain the temperature at about 1750° F. Little or no chlorine was present in the vent gases escaping through outlet 18, thus indicating that the chlorination was proceeding satisfactorily. 18,600 pounds of titanium tetrachloride was produced.

About once every 8 to 10 hours about 200 pounds of the bed were withdrawn through outlet 43. The calcium content of this withdrawn material was about 1.58 to 2.04 percent by weight. The average Ti content of this purge was about 14 percent.

*Example II*

Another run was conducted as in Example I except that the initial charge of slag was 760 pounds and the feed to the reactor was as follows:

| | Percent by weight |
|---|---|
| Slag | 75.25 |
| Coke | 16.56 |
| Silica sand | 8.19 |

When the temperature of the furnace charge reached 1000° F., 475 pounds of silica sand was added and heating continued. When the temperature reached 1200° F., coke introduction was begun. When the temperature reached 1750° F. and the coke concentration of the bed was 16 percent by weight, chlorine was introduced and regular feed of ore and coke was commenced.

This chlorination was conducted for 170 hours' chlorination time, chlorine being fed into the reactor at the rate of 80 pounds per hour per square foot of reactor cross-section and the feed being introduced at the rate of 266 pounds per hour. Coke in the bed was maintained in the range of about 10 to 25 percent by weight of the bed. A purge of about 60 pounds per hour was withdrawn through outlet 43. No clinkering took place and the reaction gases contained no unreacted chlorine during substantially the entire period of the run. 24,300 pounds of titanium tetrachloride was recovered in the experiment.

Although the present invention has been described with reference to the specific details of certain embodiments thereof, it is not intended that such details shall be regarded as limitations upon the scope of the invention except insofar as included in the accompanying claims.

What is claimed:
1. In the fluid bed exothermic chlorination of titanium-bearing material containing alkaline earth metal impurity and at least 10 percent by weight of titanium wherein agglomerate formation is encountered, the improvement which comprises establishing a fluidized bed of said material in a rising gaseous stream comprising chlorine whereby to chlorinate the material, said bed having a bottom portion which is inclined from the horizontal, introducing chlorine into the bed through said bottom portion at a plurality of spaced points disposed throughout the bottom portion, removing solids from said bed through said bottom at a point below said points of chlorine introduction, and feeding said material into said bed at a point above the point at which said gaseous stream causes fluidization of the bed and separate from the points of chlorine introduction.

2. The process of claim 1 wherein the chlorine is introduced into the bed through the bottom portion at a plurality of levels.

3. The process of claim 2 wherein said bed has a plurality of said bottom portions.

4. The process of claim 1 wherein the chlorine is introduced at a plurality of points spaced less than 15 inches from each other, the breadth of the bed being in excess of three feet.

5. The process of claim 1 wherein said material is fed to said bed at a point above said points of chlorine introduction.

References Cited in the file of this patent

UNITED STATES PATENTS

| 2,291,206 | Bowes | July 28, 1942 |
| 2,378,675 | Agnew et al. | June 19, 1945 |
| 2,433,798 | Voorhees | Dec. 30, 1947 |
| 2,443,190 | Krebs | June 15, 1948 |
| 2,478,912 | Garbo | Aug. 16, 1949 |
| 2,621,118 | Cyr et al. | Dec. 9, 1952 |
| 2,701,180 | Krchma | Feb. 1, 1955 |
| 2,723,903 | Cyr et al. | Nov. 15, 1955 |
| 2,740,752 | Anhorn | Apr. 3, 1956 |
| 2,798,030 | Hettick | July 2, 1957 |
| 2,842,425 | Andersen | July 8, 1958 |
| 2,847,316 | Michel et al. | Aug. 12, 1958 |
| 2,855,273 | Evans et al. | Oct. 7, 1958 |

FOREIGN PATENTS

| 589,054 | Great Britain | June 10, 1947 |